United States Patent
Porte et al.

(10) Patent No.: US 9,388,767 B2
(45) Date of Patent: *Jul. 12, 2016

(54) PANEL FOR THE ACOUSTIC TREATMENT COMPRISING HOT AIR DUCTS AND AT LEAST ONE STABILIZATION CHAMBER

(71) Applicant: AIRBUS OPERATIONS (S.A.S.), Toulouse (FR)

(72) Inventors: Alain Porte, Colomiers (FR); Grégory Albet, Toulouse (FR); Guillaume Ring, Toulouse (FR); Pascal Galletti, Toulouse (FR)

(73) Assignee: Airbus Operations (S.A.S.), Toulouse (FR)

( * ) Notice: Subject to any disclaimer, the term of this patent is extended or adjusted under 35 U.S.C. 154(b) by 459 days.

This patent is subject to a terminal disclaimer.

(21) Appl. No.: 13/573,784

(22) Filed: Oct. 3, 2012

(65) Prior Publication Data
US 2014/0001284 A1   Jan. 2, 2014

(30) Foreign Application Priority Data

Oct. 3, 2011 (FR) ...................................... 11 58893

(51) Int. Cl.
*F02K 1/46* (2006.01)
*F02C 7/047* (2006.01)
(Continued)

(52) U.S. Cl.
CPC . *F02K 1/46* (2013.01); *B64D 15/04* (2013.01); *B64D 33/02* (2013.01); *F02C 7/047* (2013.01);
(Continued)

(58) Field of Classification Search
CPC . F02C 7/045; F02C 7/047; B64D 2033/0206; B64D 2033/0233; B64D 15/04; B64D 33/02; F02K 1/827; F02K 1/34; F02K 1/46; F04D 2260/96–2260/964

USPC .................... 60/39.093; 239/265.11; 244/1 N
See application file for complete search history.

(56) References Cited

U.S. PATENT DOCUMENTS 3,933,327 A * 1/1976 Cook et al. ................. 244/134 B
5,841,079 A * 11/1998 Parente ......................... 181/214
(Continued)

FOREIGN PATENT DOCUMENTS

| FR | 2917067 | 12/2008 |
|----|---------|---------|
| FR | 2941675 | 8/2010 |
| FR | 2952032 | 5/2011 |

OTHER PUBLICATIONS

French Search Report for Serial Application No. 1158893 dated May 30, 2012.

(Continued)

*Primary Examiner* — Gerald L Sung
*Assistant Examiner* — Alain Chau
(74) *Attorney, Agent, or Firm* — Jenkins, Wilson, Taylor & Hunt, P.A.

(57) ABSTRACT

An aircraft nacelle comprising a lip extended by an inner conduit forming an air intake, a front frame delimiting with said lip an annular channel within which hot air flows and a panel for acoustic treatment having, from outside inwardly, an acoustic resistive layer, at least one honeycomb structure and a reflective layer as well as ducts for channeling hot air, each including one inlet communicating with the annular channel and one outlet communicating with the inner conduit, wherein the panel for acoustic treatment comprises at least a stabilization chamber in the form of an annular channel with a cross-section larger than that of the ducts which extends over at least a portion of the nacelle circumference and which communicates with a plurality of ducts, the inlets and outlets not being aligned in the longitudinal direction.

9 Claims, 6 Drawing Sheets

(51) Int. Cl.
  *B64D 33/02* (2006.01)
  *B64D 15/04* (2006.01)
  *F02C 7/045* (2006.01)
  *F02K 1/82* (2006.01)

(52) U.S. Cl.
  CPC . *B64D 2033/0206* (2013.01); *B64D 2033/0233* (2013.01); *F02C 7/045* (2013.01); *F02K 1/827* (2013.01); *Y02T 50/672* (2013.01)

(56) References Cited

U.S. PATENT DOCUMENTS

| | | | | |
|---|---|---|---|---|
| 7,588,212 | B2* | 9/2009 | Moe | B64D 15/12 244/134 D |
| 8,172,037 | B2 | 5/2012 | Porte et al. | |
| 2008/0179448 | A1* | 7/2008 | Layland | B64D 15/12 244/1 N |
| 2009/0014234 | A1* | 1/2009 | Bagnall | F02C 7/045 181/214 |
| 2010/0181420 | A1* | 7/2010 | Porte et al. | 244/1 N |
| 2010/0252685 | A1* | 10/2010 | Porte | B64D 15/04 244/134 B |
| 2010/0314082 | A1 | 12/2010 | Porte et al. | |
| 2011/0131945 | A1* | 6/2011 | Vauchel | B64D 15/04 60/39.093 |
| 2011/0133025 | A1* | 6/2011 | Vauchel | B64D 33/02 244/1 N |
| 2012/0261521 | A1* | 10/2012 | Porte | B64D 33/02 244/53 B |
| 2012/0317782 | A1* | 12/2012 | Porte | B64D 33/02 29/428 |
| 2013/0098471 | A1 | 4/2013 | Porte et al. | |
| 2013/0224000 | A1 | 8/2013 | Porte et al. | |

OTHER PUBLICATIONS

Non-Final Office Action for U.S. Appl. No. 13/632,820 dated May 11, 2015.
Non-Final Office Action for U.S. Appl. No. 13/573,802 dated Oct. 7, 2015.
Final Office Action for U.S. Appl. No. 13/632,820 dated Nov. 19, 2015.
Notice of Allowance for U.S. Appl. No. 13/573,802 dated Jan. 14, 2016.
Advisory Action for or U.S. Appl. No. 13/632,820 dated Feb. 3, 2016.
Non-Final Office Action for U.S. Appl. No. 13/632,820 dated Mar. 25, 2016.

* cited by examiner ns of panel 28 does not flow at the same temperature.# PANEL FOR THE ACOUSTIC TREATMENT COMPRISING HOT AIR DUCTS AND AT LEAST ONE STABILIZATION CHAMBER

CROSS-REFERENCE TO RELATED APPLICATION

This application claims priority to FR 11 58893 filed Oct. 3, 2011, the entire disclosure of which is incorporated by reference herein.

TECHNICAL FIELD

The present invention relates to a panel for integrated acoustic treatment of hot air ducts and at least one stabilization chamber.

BACKGROUND

An aircraft propulsion unit comprises a nacelle in which a traction system is arranged in a substantially concentric fashion.

SUMMARY

As shown in FIG. 1, nacelle 10 includes in the front air intake 12 for channeling airflow in the direction of the traction system.

Following a longitudinal section (containing the traction system rotation axis), air intake 12 includes lip 14 extending outside the nacelle through outer wall 16 and inside through inner wall 18 defining inner conduit 20 for channeling air in the direction of the traction system.

Said nacelle also includes front frame 22 which defines, with lip 14, annular channel 24 which may be used to channel hot air for frost treatment.

In order to limit noise impact, techniques have been developed to reduce internal noise, notably by providing, on the walls of inner conduit 20, panels or coatings to absorb some of the acoustic energy, namely using Helmholtz resonator principle.

In order to optimize acoustic treatment, such panels should cover the largest area. Some of panels 26 for acoustic treatment may cover inner conduit 20, those panels distant from the front frame have no frost treatment function.

Others may be arranged inside annular channel 24 at the front of frame 22 and may combine both acoustic and frost treatment functions. Finally, a panel 28 for acoustic treatment with heat resistant materials may be interposed between front frame 22 and panels 26. This panel 28 is also capable of frost treatment and includes means for capturing hot air into annular channel 24 and discharging it rearwardly into inner conduit 20.

Such a panel combining both acoustic and frost treatment functions has been described in patent FR 2,917,067. It comprises, from outside inwardly, an acoustic resistive layer, at least one honeycomb structure and a reflective layer, as well as ducts each delimited by a wall interposed between the acoustic resistive layer and the honeycomb structure.

This solution may reduce the risk of communication between the interior of the ducts and the honeycomb structure cells, and thus the risk of disturbing acoustic treatment.

According to another advantage, hot air has a volume significantly less compared to prior solutions whereby it occupies the volume of some honeycomb structure cells, which provides, on the one hand, a better hot air concentration against the wall to be defrosted, increasing defrost efficiency, and, on the other hand, a higher air pressure limiting the risk of a pressure within the structure less than the external pressure, and thus of external air penetrating inside the defrost system.

According to another advantage, hot air is in constant contact with the skin to be defrosted, which can improve exchange and reduce the temperature of hot air pushed rearwardly through the defrost system outlet, which would reject it without risking to burn the wall crossed, especially when the latter is made of a heat sensitive material such as a composite.

In general, each duct intended to channel hot air communicates at a first end with the annular channel and opens via an outlet into inner conduit 20. These ducts extend in the longitudinal direction and are distributed over the entire circumference of inner conduit 20.

At the level of annular channel 24, hot air is generally injected at a point of the circumference and flows into the annular channel revolving several times. Means are provided to homogenize the air temperature inside of the annular channel. However, temperature gradients subsist so that all the air in the ducts of panel 28 does not flow at the same temperature. Therefore, frost treatment is not uniform over the entire circumference of inner conduit 20. According to another problem, taking into account differences in air temperatures from one duct to another, the temperature of the air leaving some ducts may be much higher than the air temperature at other outlets, and greater than the temperature tolerated by materials making up the panel for acoustic treatment 26, preferably made of composite material, and arranged at the rear of panel 28.

According to another constraint, the duct outlets opening into inner conduit 20 are not subject to the same pressure. Therefore, the flow rate of each duct is closely related to the pressure difference between its inlet and its outlet, the flow rates are not the same from one duct to another which indicates disparities for frost treatment over the circumference of inner conduit 20.

A solution to make frost treatment homogeneous is to increase the duct density in areas where temperature and/or flow are called low and therefore reduce the spacing between ducts, and distance them in areas where temperatures and/or flow are higher.

This solution is not satisfactory because it leads to a more complex panel 28 and reduce the ability of acoustic treatment in areas where ducts are closely spaced. Furthermore, this solution does not solve the problem related to too high outlet temperatures.

Therefore, the present invention aims to overcome the drawbacks from prior art by providing a panel for acoustic treatment integrating frost treatment function and to homogenize the frost treatment over the circumference of the inner conduit.

To this end, the invention relates to an aircraft nacelle comprising a lip extended by an inner conduit forming an air intake, a front frame delimiting with said lip an annular channel wherein hot air flows, as well as a panel for acoustic treatment comprising, from outside inwardly, a resistive acoustic layer, at least one honeycomb structure and a reflective layer, as well as ducts for channeling hot air each duct having an inlet communicating with the annular channel and an outlet communicating with the inner conduit, wherein the panel for acoustic treatment comprises at least one stabilization chamber in the form of an annular channel with a cross-section greater than that of the ducts extending over at least part of the nacelle circumference and which communicates with a plurality of ducts, the inlets and outlets not being aligned following the longitudinal direction.

This arrangement helps obtain a better hot air mixture.

BRIEF DESCRIPTION OF THE DRAWINGS

Other features and advantages will become apparent from the following description of the invention, description provided as example only, with reference to the accompanying drawings in which.

DETAILED DESCRIPTION

Figure 1:
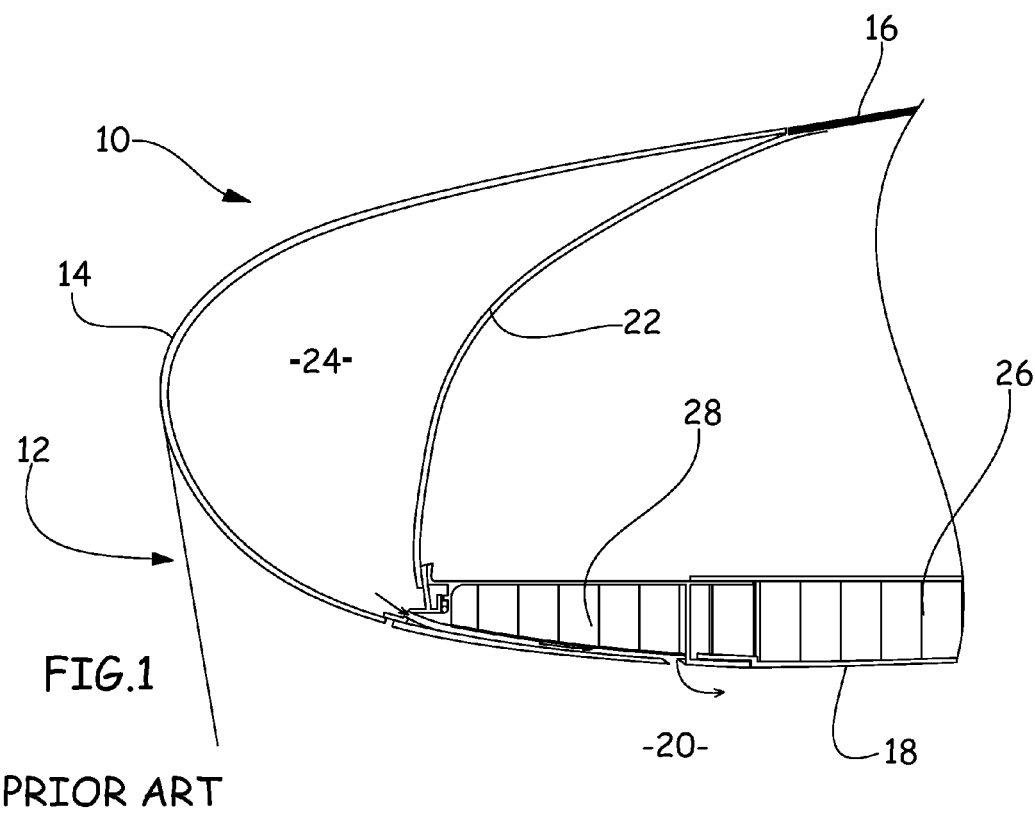
FIG. 1 is a longitudinal section of a portion of an air intake according to prior art.
Figure 2:
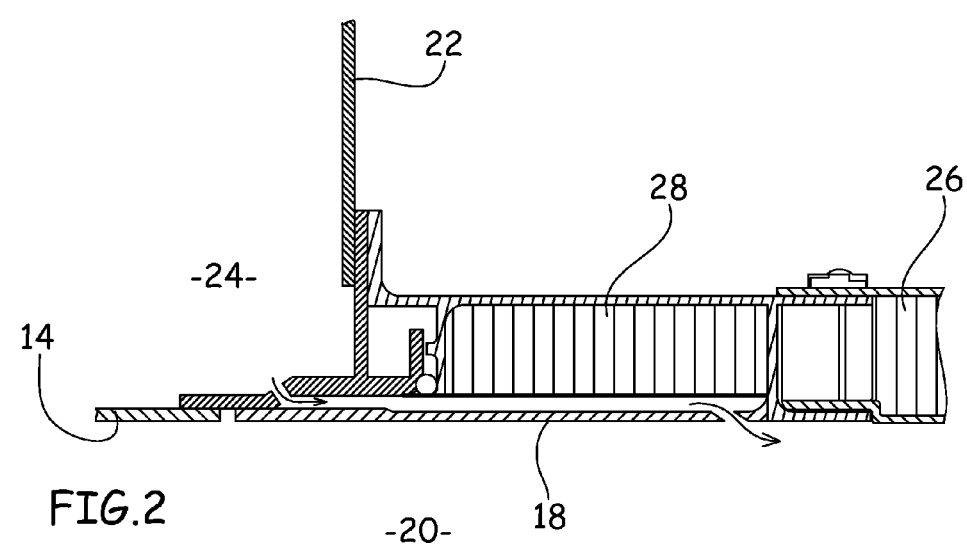
FIG. 2 is a cross-section view illustrating in detail a panel for acoustic treatment according to prior art.
Figure 3:
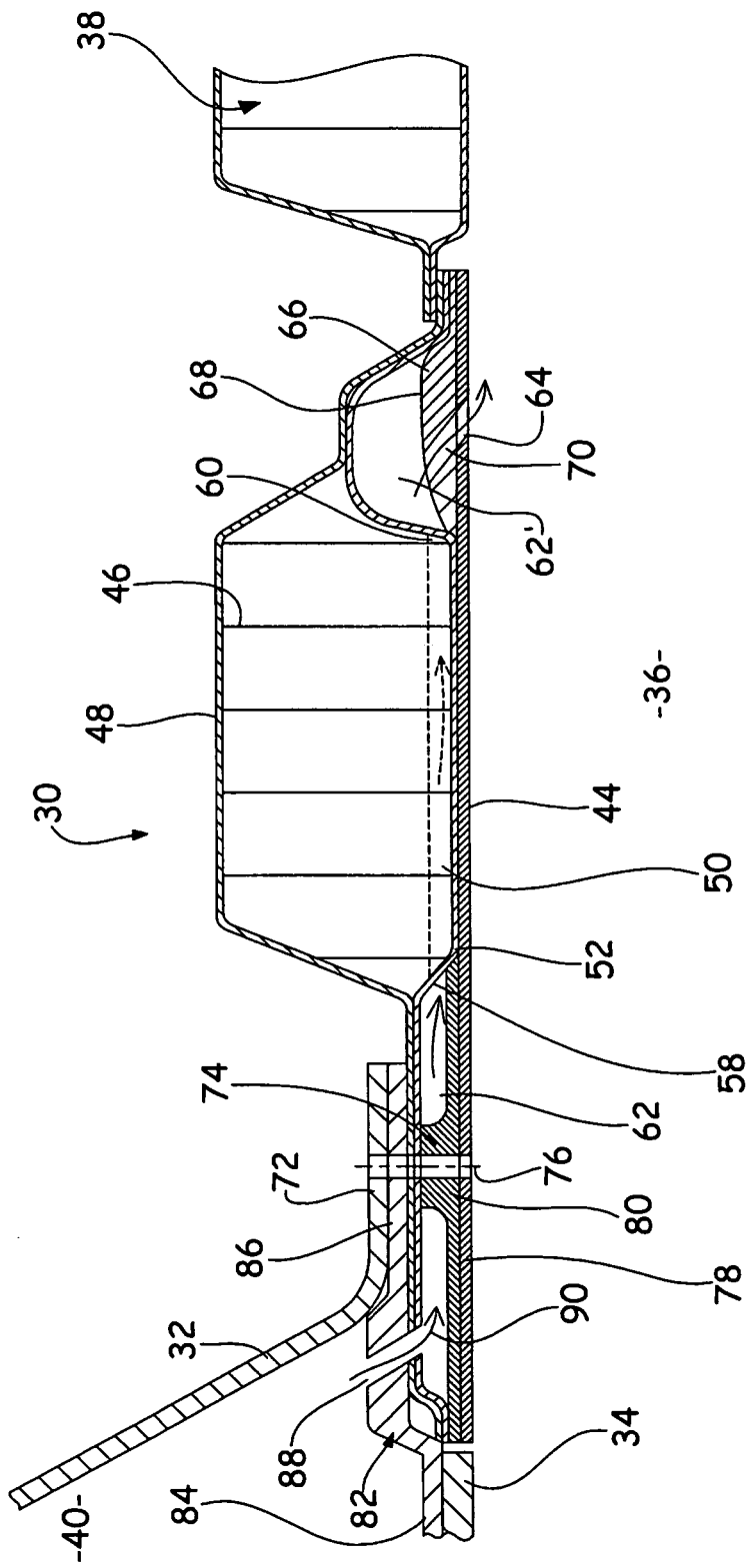
FIG. 3 is a cross-section view of a portion of an air intake according to the invention.
Figure 4A:
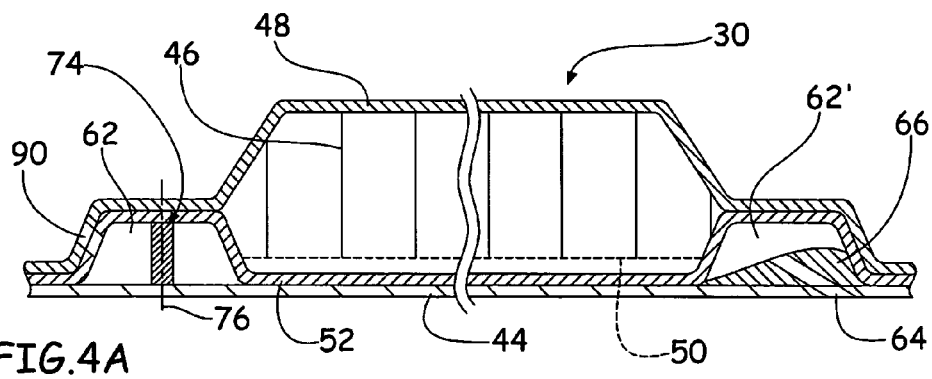
FIG. 4A is a longitudinal section along a first cross-section plane of a panel for acoustic treatment according to the invention.
Figure 4B:
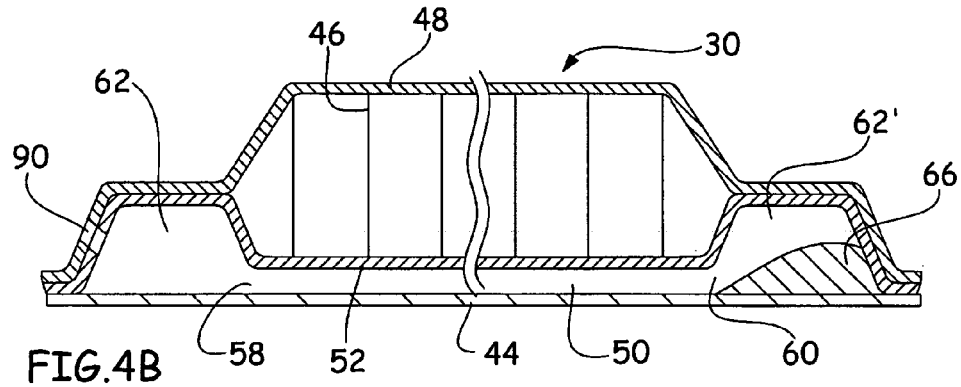
FIG. 4B is a longitudinal section along a second plane of a panel for acoustic treatment according to the invention.

In FIG. 3, panel 30 for acoustic treatment is illustrated as arranged in the rear of an air intake front frame 32 of which part of lip 34 and the front of inner conduit 36 are illustrated. Advantageously, in the rear of panel 30, inner conduit 36 is defined by a panel for acoustic treatment 38 without frost treatment typically made of composite material.

For the remainder of the description, a longitudinal plane is a plane containing the longitudinal axis corresponding approximately to the rotating axis of the traction system. A transverse plane is a plane perpendicular to the longitudinal axis. In addition, the front of panel 30 corresponds to the portion of the panel facing the lip, while the rear of panel 30 corresponds to the portion facing the nacelle outlet.

According to the invention, in order to ensure frost treatment, hot air is injected into annular channel 40 delimited by lip 34 and front frame 32. Hot air flows into the annular channel by rotating approximately around the longitudinal axis, in a direction indicated by arrows 42 in FIGS. 9, 10, 11, 13, and 14.

For the remaining description, the panel for acoustic treatment 38, the front frame, the lip, the means for injecting hot air into the annular channel are no longer detailed because they are known to the skilled person.

In a known manner, the panel for acoustic treatment 30 comprises, from outside inward, one acoustic resistive layer 44, at least one honeycomb structure 46 and one reflective layer 48, and ducts 50 which extend from the front of the panel to the rear of the panel. Advantageously, ducts 50 are delimited by at least one wall interposed between acoustic resistive layer 44 and honeycomb structure 46.

Figure 5:
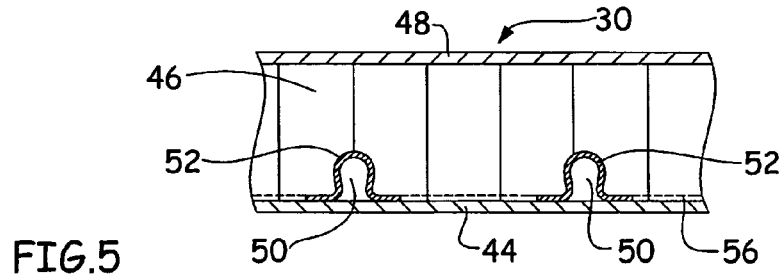
FIG. 5 is a cross-section along a first plane of a panel for acoustic treatment according to the invention.
Figure 6:
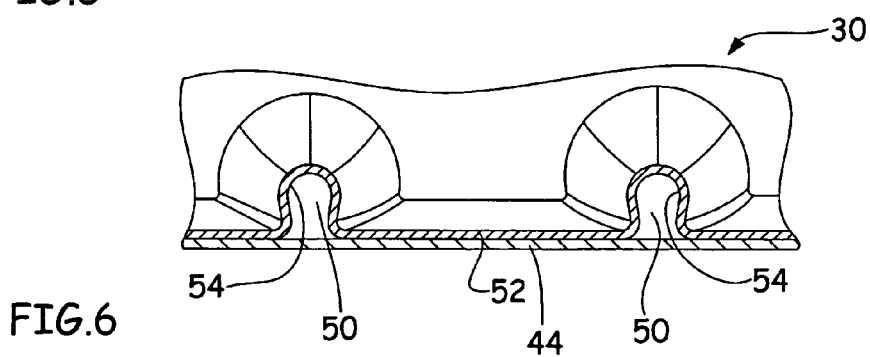
FIG. 6 is a cross-section along a second plane of a panel for acoustic treatment according to the invention.

According to one embodiment, ducts 50 are produced as described in document FR-2.917.067. However, the invention is not limited to the embodiment illustrated in this document. Thus, wall 52 may be formed with grooves 54 so as to define ducts 50 when pressed against acoustic resistive layer 44. Said wall 52 may comprise lightening holes 56 between ducts 50 in order to reduce material thickness crossed by acoustic waves, as shown in FIG. 5.

The shaping of wall 52, the assembling of acoustic resistive layer 44 and of wall 52, the embodiment of lightening holes 56, and the assembling the honeycomb structure and the reflective layer are not further detailed since various technical solutions may be considered.

According to one embodiment, ducts 50 extend approximately along the longitudinal direction. Alternatively, ducts 50 may have a helical shape.

Each duct 50 includes an inlet 58 connected to annular channel 40 and an outlet 60 connected to inner conduit 36.

According to the invention, a plurality of inlets 58 or a plurality outlets 60 are connected to a stabilization chamber 62.

Advantageously, inlets 58 and/or outlets 60 of ducts open into chamber(s) 62, 62' with a tapered shape.

Preferably a stabilization chamber 62 comprises an annular channel which extends over at least a portion of the nacelle circumference. Advantageously, stabilization chamber 62 extends over the entire periphery of the nacelle.

Downstream stabilization chamber 62 comprises at least one inlet for communicating with annular channel 40 for capturing hot air and several outlets, one for each duct 50.

In order to ensure satisfactory mixing and to reduce temperature and/or pressure disparities along the circumference, stabilization chamber 62 has a cross-section greater than or equal to the section of one duct. Advantageously, the section of the stabilization chamber is greater than or equal to 1.5 times the area of one duct 50. Preferably, stabilization chamber 62 has a height greater than or equal to twice the height of one duct 50. Preferably, the stabilization chamber has a trapezoidal cross-section in a longitudinal plane, the large base being oriented toward acoustic resistive layer 44.

According to the invention, the stabilization chamber comprises a plurality of inlets connected to annular channel 40 and a plurality of outlets connected to ducts 50 and the inlets and outlets are not aligned in the longitudinal direction but circumferentially offset. This arrangement helps obtain a better hot air mixture and homogenize its temperature and pressure before passing through duct 50.

Preferably, a stabilization chamber 62 may be provided upstream from ducts 50 and/or a stabilization chamber 62' downstream from duct 50.

According to one embodiment, each stabilization chamber 62, 62' is delimited by a wall and resistive acoustic layer 44.

Advantageously, stabilization chambers 62, 62' and ducts 50 are defined by the same wall 52. This wall is shaped by any appropriate means, including by forming.

According to one embodiment, wall 52 is in contact with resistive acoustic layer 44 upstream from stabilization chamber 62 arranged upstream from ducts 50 and downstream from stabilization chamber 62' arranged downstream from ducts 50. In addition, reflective layer 48 is pressed against wall 52 at the level of stabilization chambers 62, 62'.

Figure 7A:
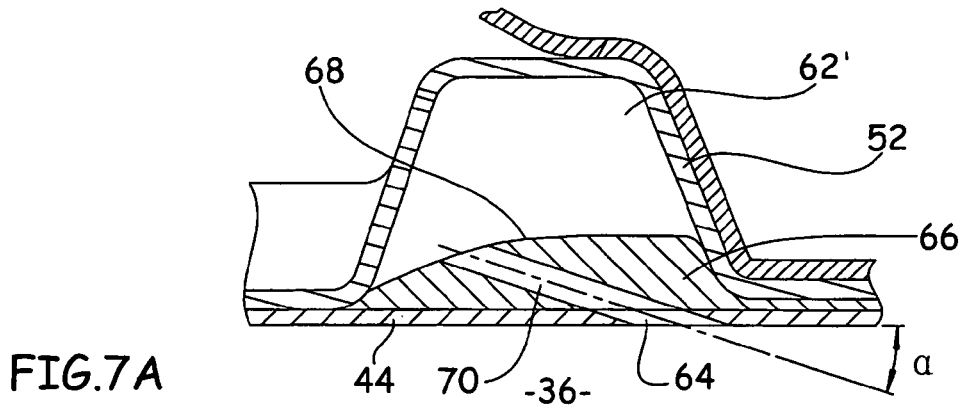
FIG. 7A is a longitudinal section view illustrating in detail a stabilization chamber located at the rear of the panel for acoustic treatment according to the invention.
Figure 7B:
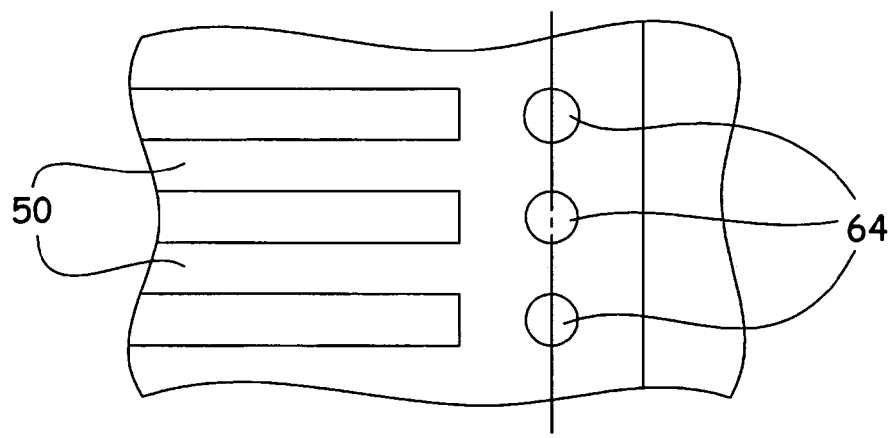
FIG. 7B is a diagram illustrating the distribution along the circumference of hot air ducts and outlets of the panel for acoustic treatment according to the invention.

At the level of stabilization chamber 62' provided downstream from the ducts, resistive acoustic layer 44 includes openings 64. As illustrated in FIG. 7B, to ensure a better homogenization of temperature and pressure, outlet ports 64 are not aligned with ducts 50 but offset. Preferably, one outlet port 64 is arranged between two areas extending from adjacent ducts.

Advantageously, stabilization chamber 62' includes means for tilting the air flow exiting outlet ports 64 and thus for limiting air flow disturbance through inner conduit 36. To this end, the panel comprises a wedge 66 pressed against the inner surface of acoustic resistive layer 44 and which upper surface 68 defines, with wall 52, stabilization chamber 62'. Said wedge 66 comprises, for each output port 64, a conduit 70 for communication between stabilization chamber 62' and matching outlet 64. Advantageously, each conduit 70 forms an angle α of less than 50° with the outer surface of the resistive acoustic layer located beyond matching outlet.

In order to facilitate air flow, top surface 68 of wedge 66 includes an upstream chamfered shape into which conduits 70 open.

In order to simplify the air circuit and to minimize acoustically untreated surfaces, the acoustic panel according to the invention is connected to the front frame on stabilization chamber 62.

To this end, front frame 32 includes a rearwardly curved edge 72 pressed against the inner surface of reflective layer 48, itself pressed against wall 52 perpendicular to stabilization chamber 62 arranged upstream of ducts 50. In order to reduce the risk of crushing stabilization chamber 62, at least one wedge 74 is arranged inside stabilization chamber 62 in regard to each means 76 providing a link between front frame 32 and the panel for acoustic treatment 30 according to the invention. In a transverse plane, wedges 74 are spaced along the circumference so as to let hot air pass from annular channel 40 to ducts 50.

According to a simplified embodiment, each wedge 74 is in the form of a tube whose axis is aligned with that of connecting means 76, its height being equal to the height of stabilization chamber 62.

Alternatively, to simplify the assembly, the panel may include at the level of stabilization chamber 62 arranged upstream from the ducts, a band of material 78 extending over at least a portion of the circumference, pressed against acoustic resistive layer 44 and including, for each connecting means 76 a embossment 80 in the form of a hollow cylinder which functions as wedge 74. Thus, according to this embodiment, several wedges 74 are connected by material band 78.

Preferably, the panel for acoustic treatment 30 is connected to the wall defining lip 34.

To this end, an annular part 82 provides connection between, on the one hand, the wall defining lip 34, and, on the other hand, acoustic panel 30 and advantageously front frame 32.

Depending on the case, annular part 82 may be mono-block and extend over the entire periphery of the nacelle, or be obtained from assembling several angular sectors.

Figure 8:
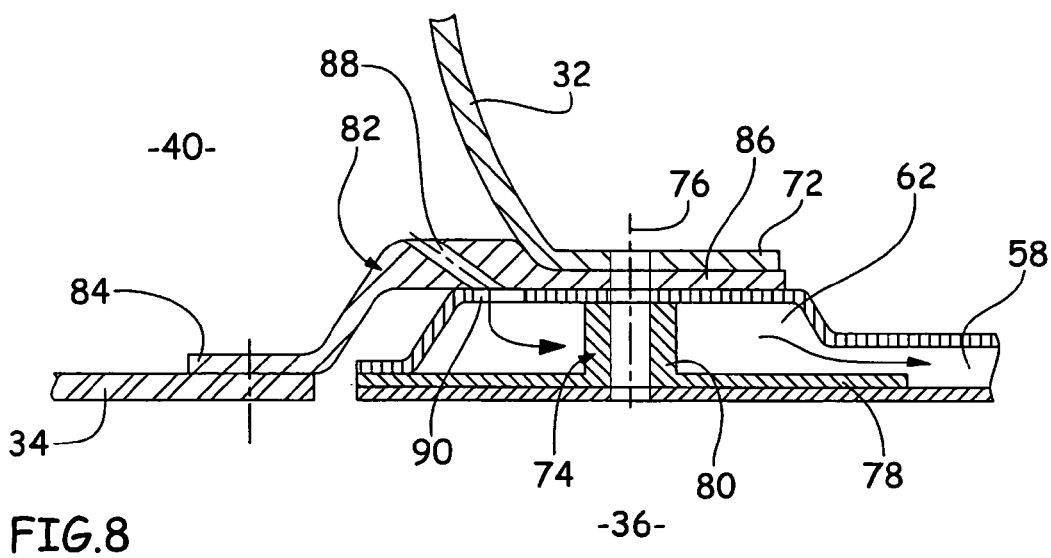
FIG. 8 is a longitudinal section view illustrating in detail one embodiment of a stabilization chamber provided in the front of a panel for acoustic treatment.

According to a particular embodiment illustrated in FIG. 8, annular part 82 has, at one end, a first part 84 formed as an annular band pressed and secured against the inner surface of the wall forming lip 34, and at the other end, a second part 86 formed as a band placed between bent edge 72 of front frame 32 and the wall defining stabilizing cavity 62 of acoustic panel 30, second part 86 being offset radially and outwardly relative to first part 84 so that the outer surface of acoustic panel 30 is in line with the outer surface of the wall that defines lip 34.

This annular part 82 comprises a plurality of conduits 88 for communicating annular channel 40 with inlets 90 of stabilization chamber 62 located upstream from acoustic panel 30.

Whatever the panel for acoustic treatment 30, the air intake comprises at least one conduit for channeling hot air from annular channel 40 to the panel for acoustic treatment 30.

In a first embodiment, shown in FIGS. 8 to 11, annular part 82 described above includes conduits 88.

Figure 12:
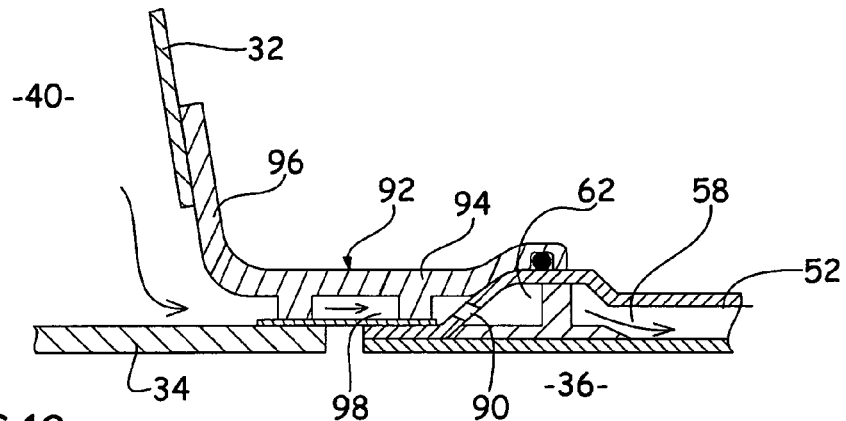
FIG. 12 is a longitudinal section view of another embodiment of the duct inlets of the panel for acoustic treatment according to the invention.
Figure 14:
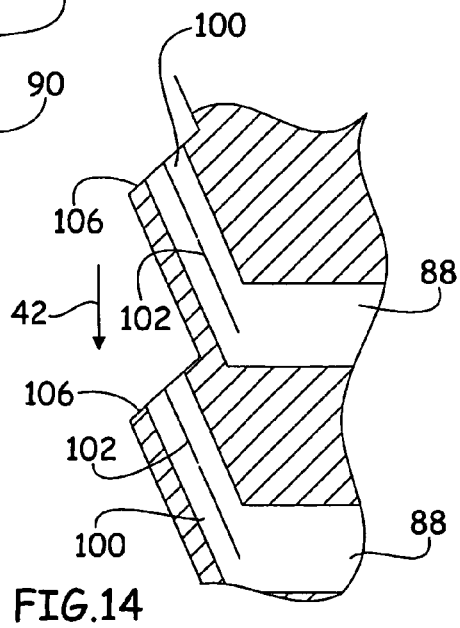
FIG. 14 is a cross-section along the circumference of a variant of the embodiment shown in FIG. 13.

According to another variant illustrated in FIGS. 12 and 14, insert 92 can bridge the gap between front frame 32, the wall defining lip 34, and acoustic panel 30. Said insert 92 comprises annular body 94 with, in the front, bent plate 96 that can be pressed and secured against the rear face of front frame 32.

In this variant, the wall defining lip 34 and the front end of the acoustic panel are pressed and secured to the bottom face (oriented toward the longitudinal axis of the nacelle) by any suitable means. On its bottom face, annular body 94 comprises recessed shapes which define conduits 98.

However, the invention is not limited to these two variants for conduits delivering hot air from the annular channel to the panel for acoustic treatment.

Thus, other conduit shapes or other solutions to define a conduit may be considered.

Each feeding conduit 88 and 98 comprises a portion called opening 100 that opens into annular channel 40.

According to the invention, opening 100 is for channeling hot air in a direction referenced as 102 forming an angle β of less than 60° with hot air flow direction 42 in the annular channel. Such arrangement ensures to capture a larger hot air flow.

Figure 9:
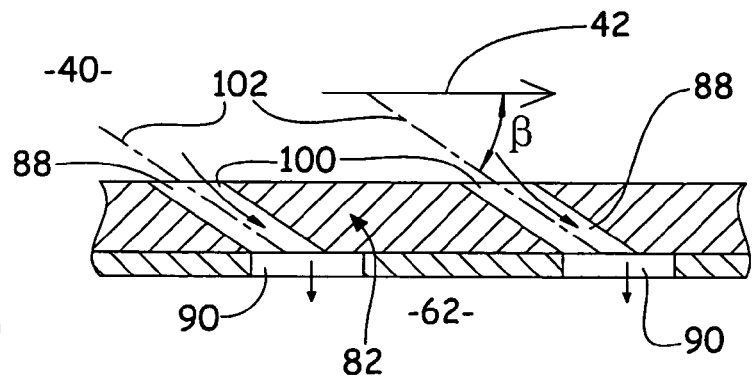
FIG. 9 is a cross-section of an embodiment of the duct inlets of the panel for acoustic treatment according to the invention.
Figure 10:
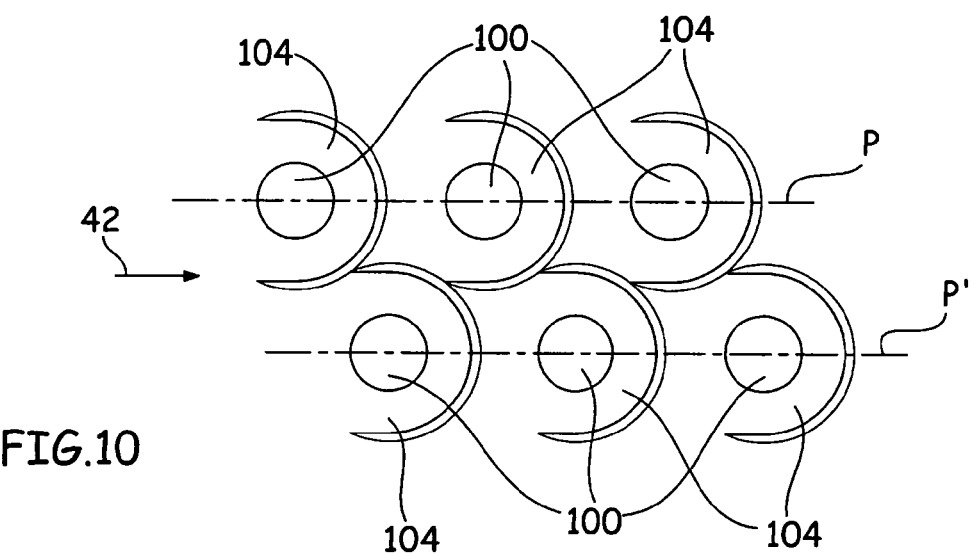
FIG. 10 is a view from inside the annular channel of another embodiment of the duct inlets of the panel for acoustic treatment according to the invention.
Figure 11:
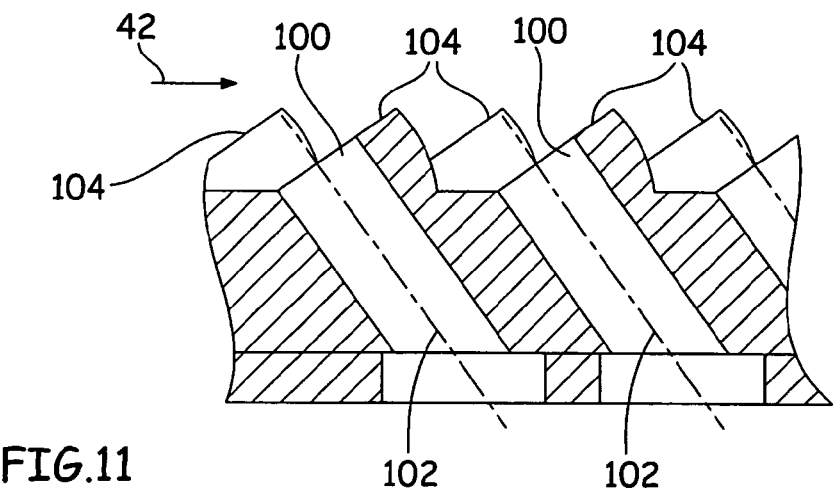
FIG. 11 is a cross-section of the embodiment shown in FIG. 10.

According to particular variations illustrated in FIGS. 9 to 11, conduits 88 have an opening 100 whose direction 102 is contained in a plane perpendicular to the nacelle longitudinal axis.

According to a first variant illustrated in FIG. 9, openings 100 are arranged in a same transverse plane.

In another embodiment illustrated in FIGS. 10 and 11, openings 100 are arranged in at least two transverse planes P, P'. Preferably, openings 100 are distributed over two planes P, P', and staggered.

According to a preferred embodiment, openings 100 open on surfaces 104 intersecting with hot air flow direction 42 in the annular channel. Advantageously, surfaces 104 are perpendicular to direction 102 of the conduits.

Figure 13:
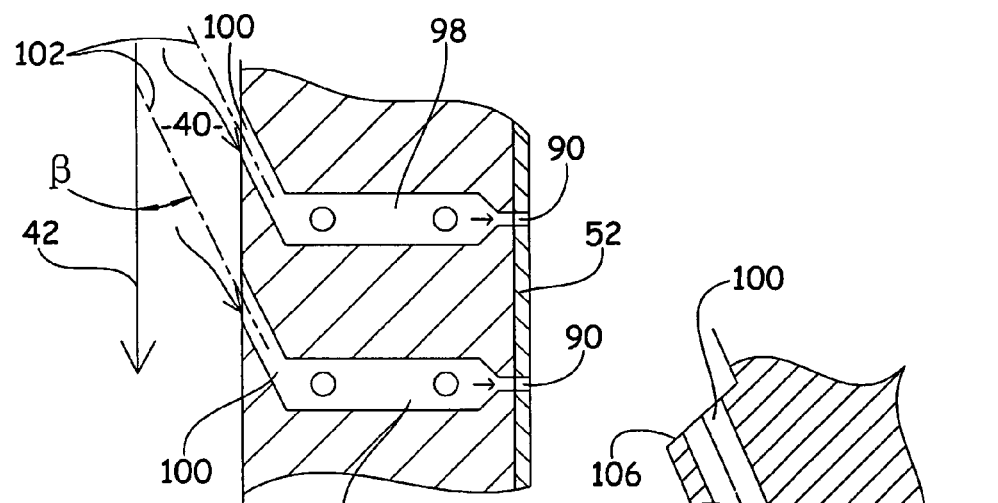
FIG. 13 is a cross-section along the circumference of the duct inlets shown in FIG. 12.

In other embodiments illustrated in particular in FIGS. 13 and 14, conduits 88 and 98 have an opening 100 with direction 102 secant with the plane perpendicular to the nacelle longitudinal axis, and substantially tangent to the circumference of the inner conduit of the nacelle. In this case, openings 100 are arranged on the inner surface of the wall defining lip 34. According to one embodiment, in order to form the conduits, one part is pressed against the inner face of the wall defining lip 34, said part having grooves that define each a conduit. The wall defining lip 34 being curved, a component of direction 102 of opening 100 of the conduits is directed towards the nacelle longitudinal axis.

According to one embodiment illustrated in FIG. 13, openings 100 are arranged in a plane parallel to hot air flow direction 42 in the annular channel. In another embodiment illustrated in FIG. 14, openings 100 open on surfaces 106 secant with hot air flow direction 42 in the annular channel. Advantageously, surfaces 106 are perpendicular to direction 102 of the conduits.

The invention claimed is:

1. An aircraft nacelle comprising:
 a lip extended by an inner conduit forming an air intake;
 a front frame defining with the lip a first annular channel within which hot air flows; and
 a panel for acoustic treatment, the panel comprising, from outside inwardly:
  an acoustic resistive layer,
  at least one honeycomb structure,
  a reflective layer,
  ducts for channeling the hot air, wherein each of the ducts comprise an inlet communicating with the first annular channel and an outlet communicating with the inner conduit, and
 at least one stabilization chamber in the form of a second annular channel with a cross-section in a longitudinal plane greater than that of the ducts, the second annular channel extending over at least a portion of a circumference of the aircraft nacelle, wherein the at least one stabilization chamber comprises a plurality of inlets in communication with the second annular channel, a plurality of outlets each communicating with one of the ducts, and a wedge for tilting flow of exhaust air in the inner conduit that is disposed inside the at least one stabilization chamber and pressed against the acoustic resistive layer in which output ports are located, and wherein the plurality of inlets and the plurality of outlets are not aligned in a longitudinal direction.

2. The aircraft nacelle according to claim 1, wherein the at least one stabilization chamber comprises a first stabilization chamber disposed upstream from the ducts and a second stabilization chamber disposed downstream from the ducts.

3. The aircraft nacelle according to claim 1, wherein the cross-section of the at least one stabilization chamber is greater than or equal to 1.5 times the section of one of the ducts.

4. The aircraft nacelle according to claim 1, wherein the at least one stabilization chamber comprises a trapezoidal cross-section in the longitudinal plane, a large base being oriented toward the acoustic resistive layer.

5. The aircraft nacelle according to claim 1, wherein the at least one stabilization chamber is provided downstream from the ducts.

6. The aircraft nacelle according to claim 5, wherein the wedge comprises, for each of the output ports, a conduit forming an angle $\alpha$ of less than 50° with an outer surface of the acoustic resistive layer located after a matching output port.

7. The aircraft nacelle according to claim 6, wherein an upper surface of the wedge comprises a beveled shape upstream into which the conduits open.

8. The aircraft nacelle according to claim 1, wherein the at least one stabilization chamber and the ducts are delimited by a common wall shaped and pressed against the acoustic resistive layer.

9. The aircraft nacelle according to claim 1, wherein the inlets and/or the outlets of the ducts open into the at least one stabilization chamber with a flared shape.

* * * * *